United States Patent [19]
Himmelsbach

[11] 3,931,629
[45] Jan. 6, 1976

[54] CONTROL ELEMENT FOR DISPLACING COMPONENTS OF OPTICAL SYSTEMS

[75] Inventor: Paul Himmelsbach, Bad Kreuznach, Germany

[73] Assignee: Jos. Schneider & Co. Optische Werke, Bad Kreuznach, Rhineland, Germany

[22] Filed: Apr. 15, 1974

[21] Appl. No.: 461,143

[30] Foreign Application Priority Data

Apr. 17, 1973 Germany............................ 2319403

[52] U.S. Cl. ................. 354/195; 350/187; 350/255
[51] Int. Cl.² G03B 3/00; G03B 13/02; G02B 15/00; G02B 7/02
[58] Field of Search ........... 354/195, 196, 270, 274; 350/187, 247, 254, 255, 257; 352/140; 353/76; 355/55

[56] References Cited
UNITED STATES PATENTS

| | | |
|---|---|---|
| 1,950,166 | 3/1934 | Durholz ............................ 354/196 |
| 3,163,701 | 12/1964 | Staubach ....................... 354/197 X |
| 3,442,577 | 5/1969 | Purvey .................................. 350/255 |
| 3,609,011 | 9/1971 | Sakaguchi ........................... 350/187 |

*Primary Examiner*—Richard A. Wintercorn
*Attorney, Agent, or Firm*—Karl F. Ross; Herbert Dubno

[57] ABSTRACT

To shift the movable lenses of a verifocal objective, or to adjust the leaves of an iris diaphragm, a flat or cylindrically curved control element is formed with camming grooves coacting with projections on the controlled members. The control element is a deformable foil, e.g. of sheet metal, in which the camming grooves are formed by deep-drawing. The foil rests against a backing element with which it is positively connected by a tongue-and-groove coupling or the like and which entrains the control element upon being rotated about their common axis by an external force.

10 Claims, 7 Drawing Figures

CONTROL ELEMENT FOR DISPLACING COMPONENTS OF OPTICAL SYSTEMS

FIELD OF THE INVENTION

My present invention relates to an optical system, e.g. on a photographic or cinematographic camera, wherein several controlled members are to be conjointly displaced in a precisely correlated manner by a control element. Such members include, for example, the axially shiftable lens mounts of the displaceable components of a varifocal objective or the leaves of an iris diaphragm.

BACKGROUND OF THE INVENTION

Varifocal objectives with two relatively axially shiftable components are well known in the art, e.g. from my prior U.S. Pat. No. 3,165,044. These components have coaxial lens mounts surrounded by a rotatable cylinder with camming grooves engaged by projections on the lens mounts whereby rotation of the cylinder about the objective axis moves each lens mount independently of the other at a rate determined by the pitch of the corresponding groove. Such camming grooves, which may be of linear or nonlinear pitch, are difficult to machine in a solid cylindrical tube or sleeve. The alternative technique of casting or molding the tube entails some difficulties in extracting the tube from the mold and also is less accurate as concerns the resulting cam shape. Similar considerations apply to the setting rings of iris diaphragms having grooves for the guidance of studs projecting from the iris leaves.

OBJECT OF THE INVENTION

The object of my present invention, therefore, is to provide a simple yet precise mechanism for jointly displacing such optical elements.

SUMMARY OF THE INVENTION

This object is realized, in conformity with my present invention, by the provision of a control element in the shape of a deformable, preferably metallic foil with a plurality of camming grooves formed by offset portions of the foil which is of substantially constant thickness.

The offset portions are formed, in a manner well known per se, by deep-drawing between suitably shaped dies. If the foil is flat or partly cylindrical, the dies may have correspondingly flat or curved surfaces. If the control element is to be a complete tube, similar to the camming sleeve of conventional varifocal objectives, the foil may be deformed between flat dies and may then be rolled into a cylinder held together by a longitudinal or oblique seam. Such a sleeve may have camming grooves extending over angles greater than 360°. With grooves less than 180° in arc length, a cylindrical camming sleeve may also be shaped between curved dies.

Advantageously, pursuant to another feature of my invention, the deformed foil rests against a rigid backing element mounted coaxially therewith for joint rotation, this backing element having a substantially continuous surface contacted by the offset foil portions. Thus, the backing element (whether a tube or a flat disk) does not have to be specially machined, with the possible exception of one or more coupling formations designed to connect it with the foil (e.g. with a tongue-and-groove fit). A desired rotation may then be imparted to the foil through the intermediary of the backing element which can be provided with manually or automatically operable actuating means for this purpose.

In the case of a metallic foil it may be advantageous to line at least the camming grooves thereof with a resinous antifriction coating, e.g. of Teflon.

BRIEF DESCRIPTION OF THE DRAWING

The above and other features of my invention will now be described in detail with reference to the accompanying drawing in which.

SPECIFIC DESCRIPTION

Figure 1:
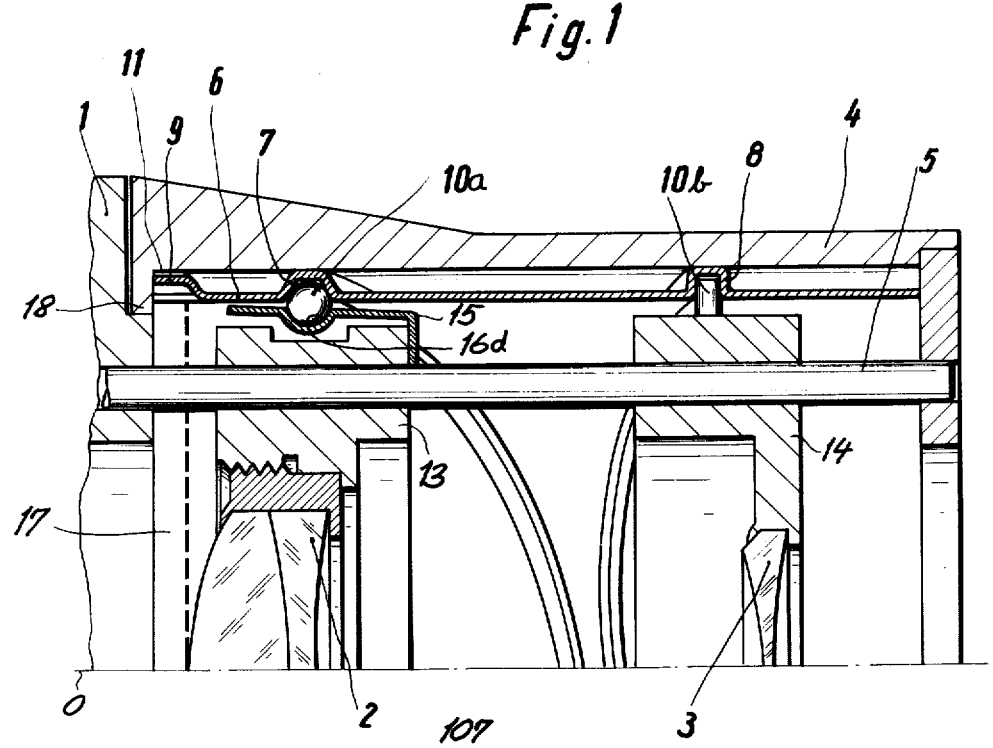
FIG. 1 is a sectional view of part of a varifocal objective provided with a control mechanism according to my invention.

In FIG. 1 I have shown part of a conventional optical objective of the varifocal type, with the stationary positive lens members omitted and with movable lens members 2, 3 held in respective lens mounts 13, 14 which are axially slidable on a set of parallel rods 5 (only one shown) peripherally spaced about the objective axis O. The rods 5 are disposed in an objective housing, partly illustrated at 1, on which a sleeve 4 for adjustment of the focal length of the objective is rotatably carried. Sleeve 4 may be rotatable by hand or by some nonillustrated automatic zooming mechanism.

Figure 2:
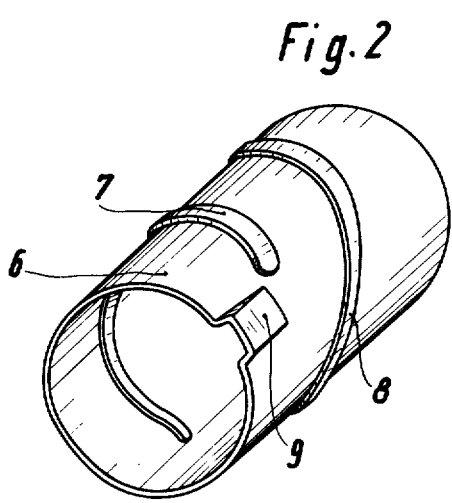
FIGS. 2 and 3 are perspective views of a cylindrical and a part-cylindrical control element, respectively, for the lens mounts of the objective of FIG. 1.

In accordance with my present invention, sleeve 4 is designed as a rigid backing element for a cylindrical control element 6 in the form of a substantially continuous metal foil in which a pair of camming grooves for the guidance of lens mounts 13 and 14 are provided without machining by an integral deformation producing portions 7 and 8 offset from the body of the foil. As best seen in FIG. 2, each of the formations 7 and 8 extends over a substantial segment of the cylinder periphery, with an arc length of about 180° in the case of formation 7 and considerably greater than that (possibly even exceeding 360°) in the case of formation 8. These formations and their respective camming grooves deviate axially from each other to a varying extent in conformity with the desired relative and absolute axial displacement of optical components 2 and 3.

Figures 5A, 5B, 5C:
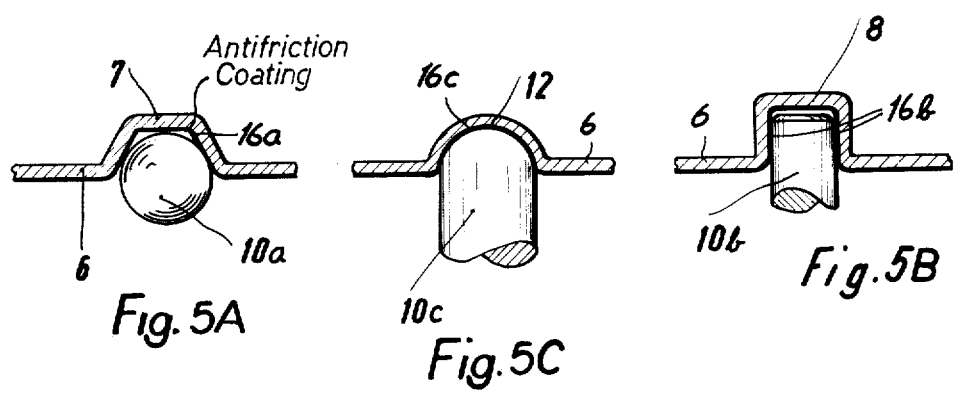
FIGS. 5A, 5B and 5C are sectional detail views illustrating several types of cam followers to be used in the system of FIG. 1.

The coupling between the cylindrical control element 6 and the lens mounts 13 and 14 may be carried out with the aid of various types of cam followers projecting from these lens mounts, here specifically a ball 10a lodged in a resilient extension 15 of lens mount 13 (in the case of component 2) and a pin 10b extending radially from lens mount 14 (in the case of component 3). As more clearly indicated in FIGS. 5A and 5B, the grooves receiving the projections 10a and 10b are advantageously lined with an antifriction coating 16a or 16b, e.g. of Teflon, for smoother action; a similar coating 16d is provided in a recess of extension 15 in which the ball 10a is cradled. As shown in FIG. 5C, the straight-cut pin 10b could also be replaced by a stud 10c with a curved end fitting into a complementarily shaped camming groove of a formation 12.

From FIG. 1 it will further be noted that the groove formations 7 and 8 (or possibly 12) rest against the inner peripheral surface of backing element 4 which reinforces the inherently deformable foil of cylinder 6 so as to prevent any distortion of the cam track.

Another integrally deformed portion 9 of element 6 constitutes a lug which fits into a recess 11 of an internal annular shoulder 17 of sleeve 4; shoulder 17 has a step 18 abutting the element 6 to prevent its axial displacement. While only one such lug 9 has been shown in FIGS. 1 and 2, it will be apparent that several lugs may be formed at peripherally spaced locations to fit into a corresponding number of recesses 11 of shoulder 17.

Figure 3:
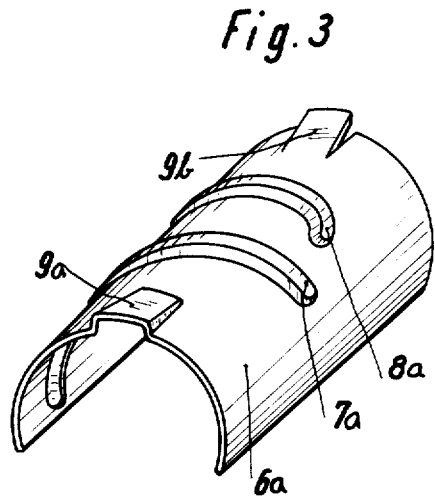

In FIG. 3 I have shown a modified control element 6a which, in contradistinction to the wholly cylindrical element 6 of FIG. 2, is only slightly larger than a semicylinder to accommodate grooved formations 7a and 8a with an arc length not greater than about 180°. Element 6a is formed at one end with a lug 9a, similar to lug 9 of FIGS. 1 and 2, and at the opposite end with a tongue 9b which differs from the lug 9a by being laterally severed from the surrounding foil. This arrangement facilitates the mounting of element 6a in a backing sleeve provided at opposite ends with a pair of stepped shoulders as shown at 17, 18 in FIG. 1.

Figure 4:
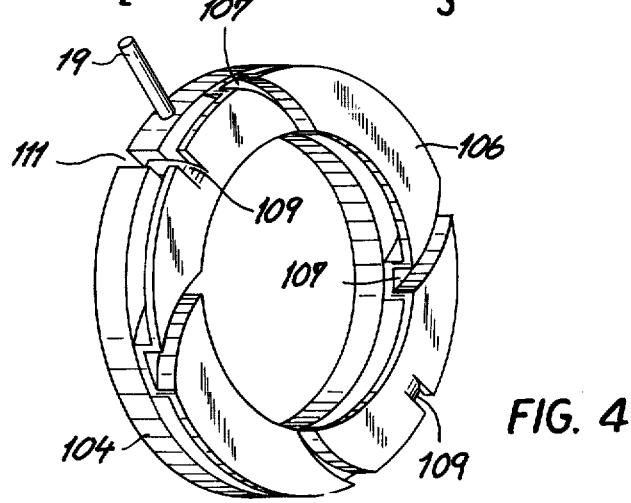
FIG. 4 is a perspective view of a setting ring for an iris diaphragm embodying features of my invention.

In FIG. 4 I have illustrated a control ring 106 for a conventional iris diaphragm, not shown, consisting of a metal foil with integrally deformed portions 107 defining guide grooves for the studs of the iris leaves. The formations 107 rest against an annular backing element 104 which, with the aid of a stud 19, can be coupled to an externally accessible setting ring on the objective housing as is well known per se. The rigid backing ring 104 has notches 111 receiving tongues 109 integrally projecting from the plane of the control ring 106 to couple the rings 104 and 106 to each other for joint rotation.

Although the grooved portions 107 in FIG. 4 are shown to have the same rectangular profile as the portions 8 in FIGS. 1 and 5B, they could also be shaped trapezoidally or arcuately in the manner of formations 7 and 12.

The antifriction coatings 16a – 16c in FIGS. 5A – 5C, if extended over the full length of element 6 (or 6a), may also be suitably tinted to prevent objectionable light reflections on the inner cylinder wall.

All the camming grooves of element 6, 6a or 106 can be produced in a single deformation step, together with the associated coupling formations 9, 9a, 9b or 109, in a highly economical manner without any chip removal and thus with no loss of material.

I claim:

1. In an optical system comprising a plurality of members centered on an axis which are to be jointly displaced in a coordinated manner, the combination therewith of a common control element for said members comprising a substantially continuous foil of imperforate sheet material with spaced-apart deformations offset from the body of the foil constituting a plurality of camming grooves, said foil being rotatable about said axis, and projections on said members respectively received in said camming grooves, said foil being of substantially constant thickness throughout said body and said deformations.

2. The combination defined in claim 1, further comprising a rigid backing element for said control element mounted coaxially therewith, said backing element having a substantially continuous surface spaced from said body but contacted by said deformations.

3. The combination defined in claim 2 wherein said backing element and said control element are provided with coacting formations coupling same to each other for joint rotation about said axis.

4. The combination defined in claim 3 wherein said backing element is provided with actuating means for rotating same about said axis.

5. The combination defined in claim 4 wherein said elements are generally cylindrical.

6. The combination defined in claim 5 wherein said members are lens mounts, further comprising guide means for said lens mounts extending parallel to said axis.

7. The combination defined in claim 4 wherein said elements are flat.

8. The combination defined in claim 1 wherein said projections include a ball lodged in a recess of a resilient extension of at least one of said members.

9. The combination defined in claim 1 wherein said foil consists of metal.

10. The combination defined in claim 9 wherein said foil is provided with a resinous antifriction coating at least in said grooves.

* * * * *